US006400934B1

(12) United States Patent
Calixte

(10) Patent No.: US 6,400,934 B1
(45) Date of Patent: Jun. 4, 2002

(54) METHOD FOR RADIO RECEIVER INPUT OFF-CHANNEL AND ON-CHANNEL OVERLOAD PROTECTION

(75) Inventor: Joseph Andral Calixte, Miramar, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/896,352

(22) Filed: Jun. 29, 2001

(51) Int. Cl.[7] .................................................. H04B 1/16
(52) U.S. Cl. ......................................... 455/217; 455/83
(58) Field of Search ............................... 455/217, 232.1, 455/234.1, 234.2, 254, 226.1, 226.2, 83, 78, 82

(56) References Cited

U.S. PATENT DOCUMENTS

| 4,641,365 | A | * | 2/1987 | Montini, Jr. |
| 6,141,561 | A | * | 10/2000 | Izumiyama |
| 6,195,535 | B1 | * | 2/2001 | Kurchuk |
| 6,272,327 | B1 | * | 8/2001 | Kurchuk et al. |

* cited by examiner

Primary Examiner—Nguyen T. Vo
Assistant Examiner—Nghi H. Ly

(74) Attorney, Agent, or Firm—Frank M. Scutch; Andrew S. Fuller

(57) ABSTRACT

A method (200) for protecting receiver circuitry from high radio frequency (RF) overload voltages input to the antenna by monitoring power level and received RSSI level includes detecting (209) inside the receiver any reverse RF power on an antenna (201) connected to the receiver. The detected RF power is converted (211) to a direct current (DC) voltage. The DC voltage is compared (213) against a predetermined reference voltage. A switch (205) is than actuated (219) to disconnect the antenna if the DC voltage exceeds the reference voltage. Moreover, a radio signal strength indication (RSSI) is detected (221) based upon a received on-channel signal and is compared (223) to a first reference voltage. A secondary RF attenuator is actuated (225)if either the RSSI is lesser than the first reference voltage (223) or greater than a second reference voltage(227) for reducing input signal strength from the antenna. Thus, if a receiver is receiving a medium-strength on-channel signal (RSSI level falls between the first and second reference voltage), the secondary section of the transmit/receive switch will not be activated to minimize the degradation of the received signal. As long as an overdrive condition exists (231), the RSSI level will be monitored. If the monitored reverse power voltage (239) falls below the predetermined reference voltage (241), the secondary section of the transmit/receive switch will be disabled (245).

3 Claims, 3 Drawing Sheets

METHOD FOR RADIO RECEIVER INPUT OFF-CHANNEL AND ON-CHANNEL OVERLOAD PROTECTION

TECHNICAL FIELD

This invention relates in general to two-way radios and more particularly to the protection of two-way radio circuitry from high radio frequency (RF) input levels.

BACKGROUND

Two-way radio equipment is commonly used for many types of everyday functions such a police, fire, government and military applications. This equipment can range from small portable radios to the more complex higher power base station equipment. The higher power equipment is essentially that equipment used in either mobile or base station applications.

A problem often occurs when two or more high-power radios are in close proximity i.e. less than 10 feet apart. This can present itself when two or more mobile radios are positioned very close to one another or two high-power base station radios are used with antennas that are positioned in close proximity. When this occurs, the radiated radio frequency (RF) energy from the nearby transmitting radio can overload the receiver front-end circuitry of any radio in idle or stand-by mode. This can cause either immediate or long-term degradation in the sensitivity of the nearby receiver.

The impact of the overload condition will depend on any number of factors. These include the level of the transmitter power, frequency of operation of either receive or transmit radio, proximity of the antenna system and the duration of the overdrive conditions. Generally speaking, the higher the transmitted power from the offending radio, the more severe the degradation in the second receiver. The frequency of operation of either receive or transmit radio also plays a role in the potential damage to the receive radio. For instance, if receive and transmit radios belong to different bandsplits, (i.e. VHF vs. UHF), the potential for damage is reduced since the preselector in front of the receive amplifier device will knock down the level of the interfering signal that reaches the pre-amplifier device. In fact, the worst-case scenario occurs when the two or more high-power units operating in close vicinity belong to the same bandsplit (i.e. either VHF, UHF or 800MHz). In this particular instance, the overloading signal falls within the passband of the preselector in front of the pre-amplifier device, thereby exposing the pre-amplifier device in the receive radio to the full blast of the interfering signal. Another factor in this issue has to do with how long the receiver is exposed to the overdrive conditions. Eventually, the longer the transmitter remains keyed up, the greater the potential for damage to the pre-amplifier device. The net effect of the front-end overload is to reverse-bias the base-emitter junction of the amplifier device and, as a result, the direct current (DC) gain of the device will degrade. As the DC gain of the device degrades, so does the receive radio sensitivity. Ultimately, the amplifier device would have to be replaced causing unneeded repair time and expense.

As seen in prior art FIG. 1, this problem has been dealt with in the past by implementing a system 100 using some type of push-to-talk (PTT) relay or T-R switch. A first high power radio transceiver 101 is used in connection with a relay 103a. When the first radio transceiver 101 is in transmit mode, the relay is keyed or positioned such that RF energy is output to its associated antenna 105. With another radio transceiver 109 in close proximity, the Push-To-Talk (PTT) signal from transceiver 101 is used to position the relay 103b such that antenna 111 is no longer directly connected to the radio transceiver 109. This prevents powerful stray RF energy from entering the receiver front end of radio transceiver 109 and causing damage to the front-end device.

Either relay 103a or 103b is toggled through the PTT function of either radio transceiver assuming an operator will be transmitting on only one radio transceiver at a time. As seen in FIG. 1, when each respective radio transceiver is not connected to its antenna, the RF energy captured by the antenna is directed away from the radio from the radio front end towards a non-reactive load (107, 113).

The problem with this type of system is that it requires attachment of relays 103a, 103b and prevents one of the radio transceivers from operating properly when its antenna is not connected due to operation of the other transceiver. Another limitation of the system described above is that it relies exclusively on the transmit status of the nearby transceiver to activate the relay. If a third transceiver were to enter the picture and transmit nearby, both transceivers 101, 109 would be left unprotected because the transmit status of that third unit would be unknown to relays 103a, 103b.

Thus, the need exists to provide a method of receiver overload protection that is integrated into the radio transceiver in order to prevent damage and/or long term degradation in receiver sensitivity without the need for an external relay or switch to disconnect the antenna of another transceiver in close proximity.

DETAILED DESCRIPTION OF THE PREFERRED EMBODIMENT

Figure 1:
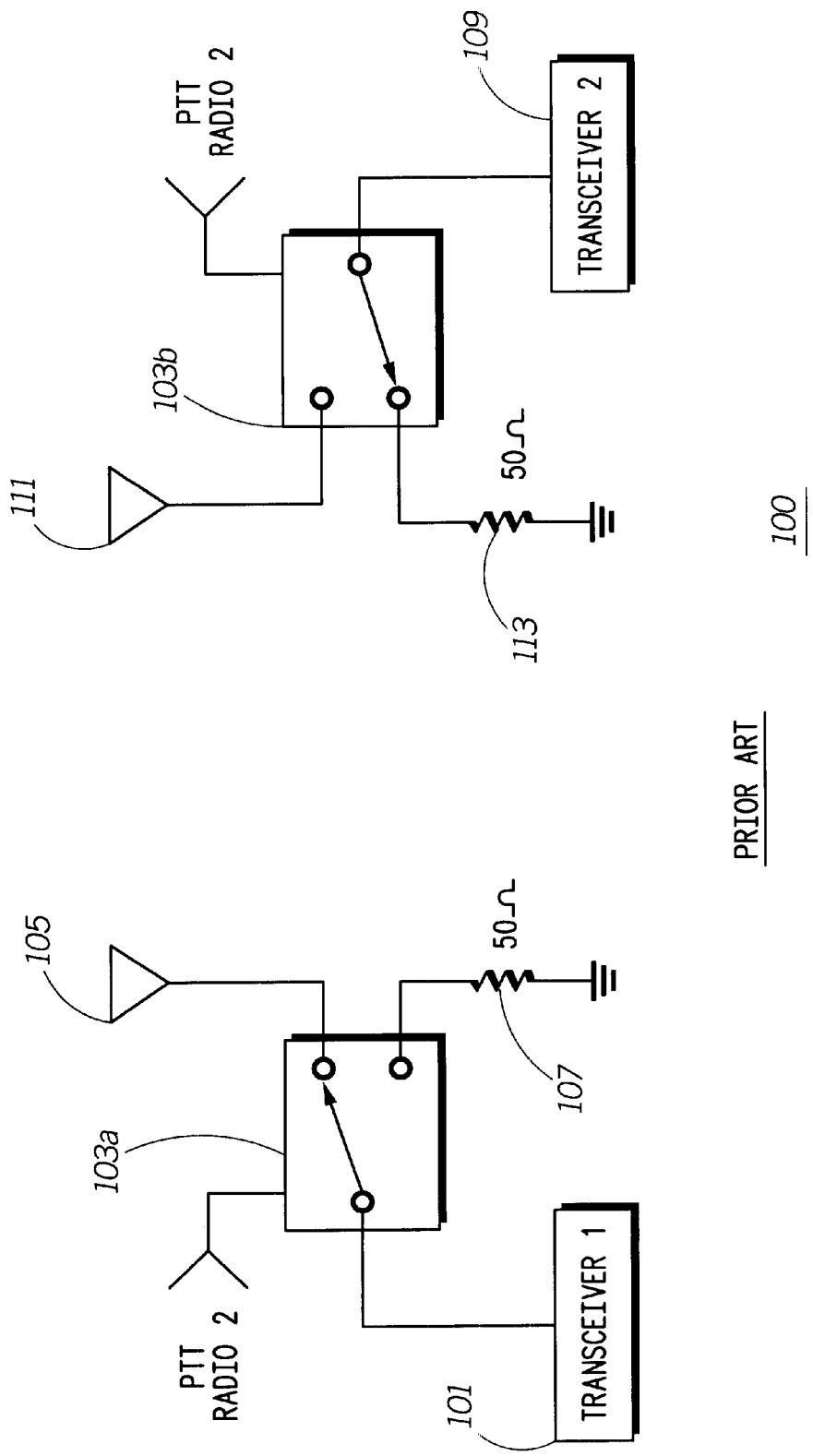
FIG. 1 is a block diagram showing the prior art implementation of a radio input circuitry from high RF input levels using a relay.
Figure 2A:
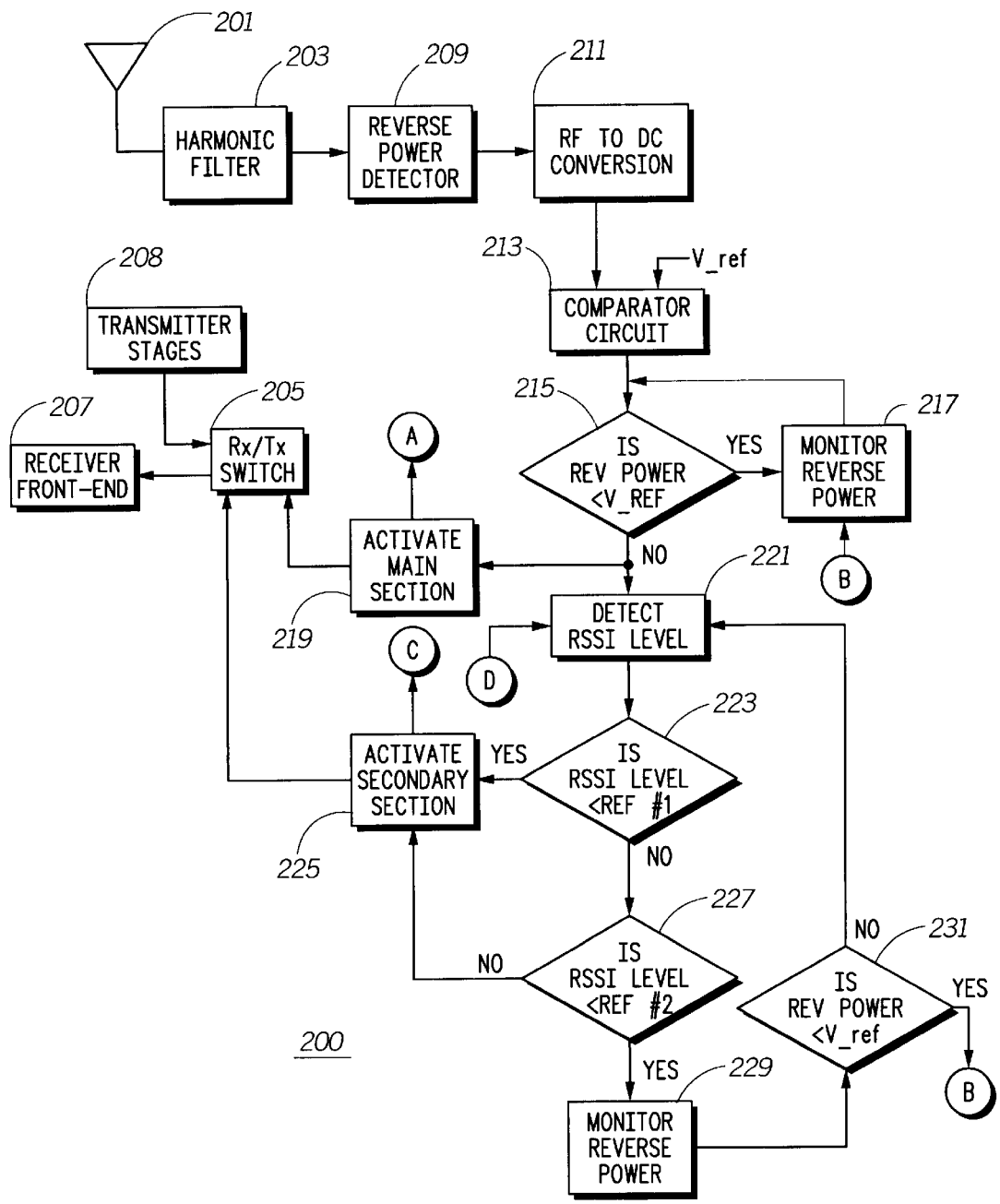
FIG. 2A, 2B and 2C are a flow chart block diagrams showing a method for receiver overload protection according to the preferred embodiment of the invention.
Figures 2B, 2C:
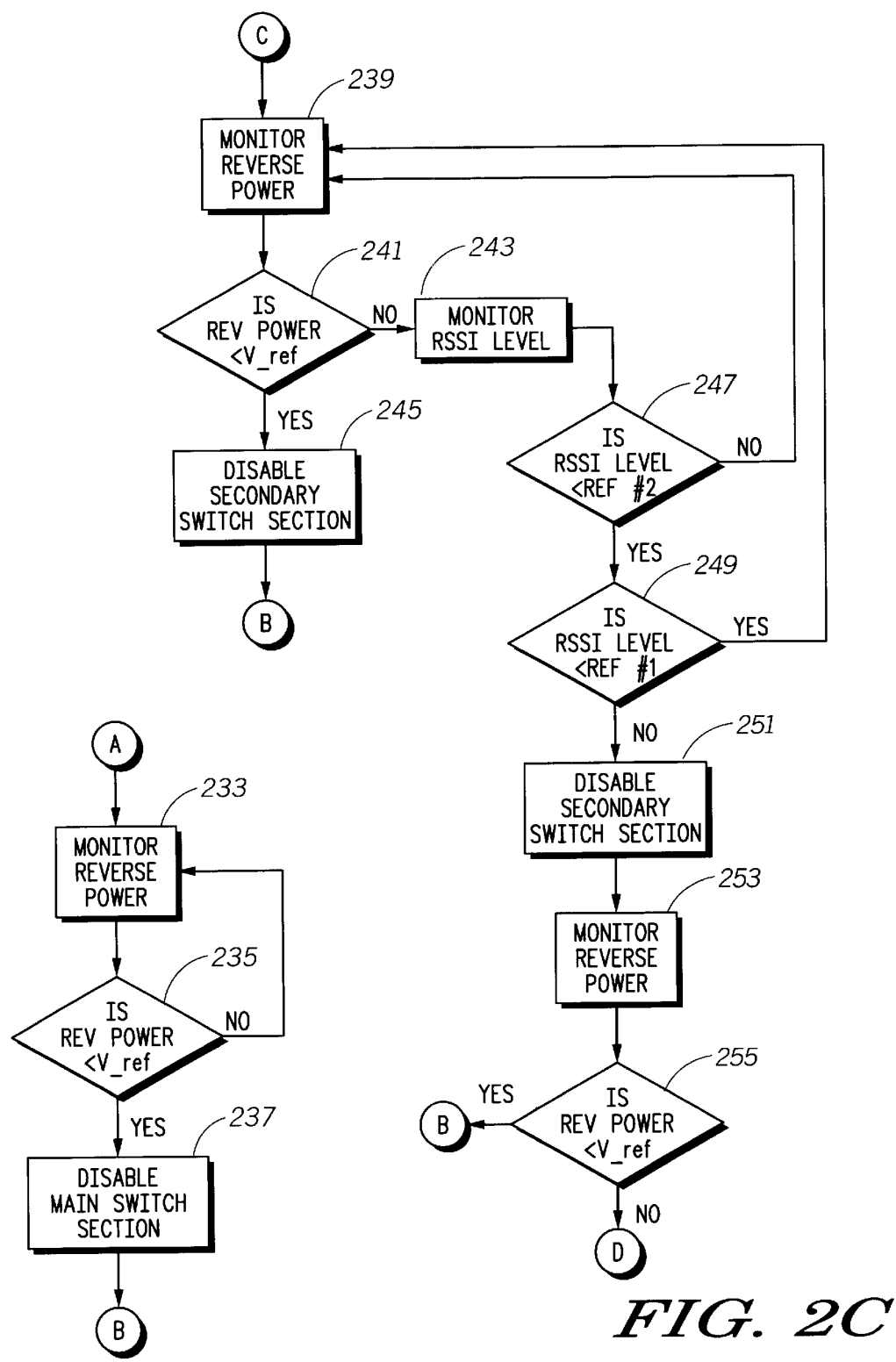

Referring now to FIG. 2A, 2B and 2C, a method for receiver overload protection is disclosed that will monitor the reverse power and received signal strength indication (RSSI) input to a radio transceiver to insure that adequate overload protection is provided for the transceiver's preamplifier device whenever the reverse power level exceeds a pre-determined threshold.

The method for protecting receiver circuitry from high radio frequency (RF) overload voltages input to the antenna is utilized in a system 200 where RF energy from either an on-channel or off-channel signal is input though the antenna 201. The RF signal is passed though a harmonic filter 203 where unwanted frequency components can be removed from the RF input signal. This energy is directed through a transmit/receive switch or relay 205 to the receiver circuitry, such as the preselector filter and preamplifier stage commonly referred to as the receiver "front end" 207. The transmit/receive switch 205 is used to switch between the receiver 207 and the transmitter 208.

While in receive, a reverse power detector 209 is used to monitor and detect the amount of RF power input through the antenna 201. There will be cases in which there is a large amount of RF energy present on the line due to either on-channel or off-channel input signals that raise the total RF input signal level beyond a predetermined threshold. The RF signal level detected by the RF detector 209 is converted to a direct current (DC) voltage using RF-to-DC converter 211. The RF detector 209 can be a directional coupler that monitors RF energy flowing into the receiver 207. The RF-to-DC converter 211 is typically some type of rectifier such as a signal diode or the like.

A comparator circuit 213 is used to continuously compare the reverse DC signal voltage level against a predetermined Vref value. If the detected DC signal voltage level remains less than the predetermined Vref value 215, then the reverse RF energy on the input signal line continues to be monitored 217. In the event that the reverse DC signal voltage level is equal to or greater than the Vref value 215, then the main section of the transmit/receive switch 205 is activated 219. In order to prevent damage to the receiver front end 207, the main section of the transmit/receive switch 205 enables the input signal to be disconnected or shunted away from the receiver front end 207. The main section 219 alone provides anywhere from 20 to 30 decibels (dB) of isolation between the incoming signal and the receiver front end 207. Since the reverse RF energy is a dynamic quantity (its level varies as the mobile unit travels through the coverage area), the reverse power level continues to be monitored 233 after the main section of the transmit/receive switch is activated. If the reverse power falls below the predetermined Vref value 235, the overload condition no longer exists and the main section of the transmit/receive switch is disabled 237.

Once an overload condition has been identified, additional protection for the receiver front end 207 can be achieved by activating the secondary section of the transmit/receive switch 225. Activation of the secondary section of the switch will depend on the received signal strength level 221. If the detected RSSI level is less than a first reference voltage 223 (radio in stand-by mode) or greater than a second reference voltage 227 (radio receiving a strong on-channel signal), then the secondary section is activated 225. If the mobile unit is receiving a medium-strength on-channel signal (RSSI level falls between the first and second reference voltage), the secondary section of the transmit/receive switch will not be activated to minimize the degradation of the received signal. As long as the overdrive condition exists 231, the RSSI level will be monitored. Of course, if the monitored reverse power voltage 239 falls below the predetermined Vref voltage 241, the secondary section of the transmit/receive switch is disabled 245.

Similar to the reverse power level, the received signal strength is a dynamic quantity that varies as the mobile unit travels through the coverage area. Hence, after activation of the secondary switch section, there is a need to keep on monitoring the RSSI level 243. As long as the RSSI level is higher than the second reference voltage 247 or less than the first reference voltage 249, the secondary switch section will be kept activated. Otherwise, the secondary section will be disabled 251 to optimize the received signal quality. The reverse power is then monitored 253. If the reverse power is greater that the reference value 255, the reverse power is again monitored 217. If the reverse power is not greater than the reference voltage than the RSSI level is again detected 221 with continued comparison with a first reference voltage and second reference voltage.

In summary, the reverse power level is continuously monitored through the reverse power detector 209. If the reverse power is equal to or exceeds a predetermined Vref value, then the main section of the transmit/receive switch is activated to protect the receiver front end circuitry 207 from overdrive conditions. Once an overload situation has been identified, activation of the secondary section of the transmit/receive switch will depend on the RSSI level. As long as the radio is receiving a medium-strength on-channel signal (the RSSI level falls between a first and second reference voltage), the secondary switch section will not be activated in order to minimize the degradation of the received audio. Otherwise, the secondary switch section is enabled to provide additional protection for the receiver front end circuitry.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for protecting receiver circuitry from high radio frequency (RF) overload voltages input to the antenna comprising the steps of:

detecting inside the receiver any reverse RF power on an antenna connected to the receiver;

converting inside the receiver the RF power to a direct current (DC) voltage;

comparing inside the receiver the DC voltage against a predetermined reference voltage;

actuating inside the receiver at least one switch to disconnect the antenna if the DC voltage exceeds the reference voltage;

detecting inside the receiver the radio signal strength indication (RSSI) of a received on-channel signal comparing inside the receiver the RSSI against a first reference voltage;

actuating a secondary RF attenuator if the RSSI is less than the first reference signal level for reducing input signal strength from the antenna;

comparing inside the receiver the RSSI against a second reference DC voltage; and actuating a secondary RF attenuator if the RSSI is greater than the second reference voltage for reducing input signal strength from the antenna.

2. A method for radio receiver input overload protection against off-channel and on-channel radio frequency (RF) energy comprising the steps of:

detecting an off-channel reverse power level input to the receiver;

converting the detected power level to a direct current (DC) voltage;

comparing the detected power level with at least one reference voltage;

actuating a transmit receive switch to disconnect signals input to the receiver if the detected power level exceeds a predetermined threshold;

determining a radio signal strength indication (RSSI) level from an on-channel input signal to the receiver;

actuating a secondary attenuator in the transmit receive switch to attenuate the input to the receiver if the RSSI level is less than a first predetermined threshold; and actuating a second attenuator in the transmit receive switch to further attenuate the input to the receiver if the RSSI level is greater than a second predetermined threshold.

3. A method for receiver input off-channel and on-channel radio frequency (RF) overload protection comprising the steps of:

filtering a receiver input from an antenna through a harmonic filter;

detected any amount of reverse RF power on the receiver input from either on-channel or off-channel RF signal;

rectifying the detected RF power to provide a direct current reverse power voltage;

comparing the direct current reverse power voltage with a predetermined reference value;

shunting the path of the input signal using a transmit/receive switch if the direct current reverse voltage signal is equal to or exceeds a predetermined reference value;

determining the received signal strength indication (RSSI) from an on-channel received signal;

comparing the RSSI to a first reference level;

actuating a secondary attenuator in the transmit/receive switch in the radio if the RSSI is less than the first reference voltage for reducing the input signal amplitude;

comparing the RSSI to a second reference voltage; and actuating a second attenuator in the transmit/receive switch in the radio if the RSSI is greater than the second reference level for further reducing the input signal amplitude from the first attenuator.

* * * * *